(12) United States Patent
Kishi et al.

(10) Patent No.: US 8,353,779 B2
(45) Date of Patent: Jan. 15, 2013

(54) SUPPORT STRUCTURE FOR BOLTING COMPONENTS OF DRIVE SHAFT VIA MOUNTING MEMBER

(75) Inventors: Masao Kishi, Kanagawa (JP); Masanori Oinuma, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 1224 days.

(21) Appl. No.: 11/230,567

(22) Filed: Sep. 21, 2005

(65) Prior Publication Data
US 2006/0063598 A1 Mar. 23, 2006

(30) Foreign Application Priority Data
Sep. 21, 2004 (JP) .................................. 2004-272906

(51) Int. Cl.
*F16D 1/06* (2006.01)

(52) U.S. Cl. .................. 464/182; 411/107; 411/DIG. 2; 464/906

(58) Field of Classification Search .................. 411/82.5, 411/107, 352, 353, 368, 999, DIG. 2; 403/12; 464/182, 906
See application file for complete search history.

(56) References Cited

U.S. PATENT DOCUMENTS

| | | | | |
|---|---|---|---|---|
| 255,043 A * | 3/1882 | Smith | ........................ | 411/368 X |
| 2,224,465 A * | 12/1940 | Otto | ........................... | 464/182 X |
| 3,122,050 A * | 2/1964 | Wenson | ........................ | 411/999 |
| 3,416,823 A * | 12/1968 | Auer | ........................ | 411/DIG. 2 |
| 3,770,036 A * | 11/1973 | Sherman | ........................ | 411/999 |
| 6,280,132 B1 * | 8/2001 | Szczukowski et al. | ........ | 411/353 |
| 2004/0197219 A1 | 10/2004 | Degen et al. | | |
| 2005/0201848 A1* | 9/2005 | Reilly | ........................... | 411/353 |
| 2008/0025813 A1* | 1/2008 | Wu et al. | ........................ | 411/353 |

FOREIGN PATENT DOCUMENTS

| | | |
|---|---|---|
| JP | UM 55-119415 | 2/1954 |
| JP | UM 49-112062 | 10/1974 |
| JP | UM 59-045322 | 3/1984 |
| JP | 03-009118 | 1/1991 |
| JP | 2004-095604 | 3/1992 |
| JP | A-7-4423 | 1/1995 |
| JP | 2003-112533 | 4/2003 |
| WO | WO 03/020460 | 3/2003 |

* cited by examiner

*Primary Examiner* — Gregory Binda
(74) *Attorney, Agent, or Firm* — Antonelli, Terry, Stout & Kraus, LLP.

(57) ABSTRACT

A support structure for bolting components of a drive shaft via a mounting member that comprises at least are mounting member of the drive shaft having formed through a bolt hole, a female thread portion which is formed in the mounting member, the bolt having a male thread portion can be screwed into the female thread portion by inserting the bolt into the bolt hole, and a heat-shrinkable tube that is adapted to provide elastic contact at an inner surface of the bolt hole.

12 Claims, 11 Drawing Sheets

(a)

(b)

(a)

(b)

SUPPORT STRUCTURE FOR BOLTING COMPONENTS OF DRIVE SHAFT VIA MOUNTING MEMBER

BACKGROUND OF THE INVENTION

The present invention relates to a support structure for a constant velocity joint, a cross joint and a center bearing support fixing a shaft to a vehicle body by a bolt, and more particularly, to a support structure that is temporarily fixed to the bolt before fixing to the vehicle body.

A bolt support structure for a drive shaft that fixes the drive shaft to a mounted member by a bolt is disclosed in JP-A-7-4423.

The drive shaft is fixed to the vehicle body by a bolt. The bolt is inserted into a bolt hole, which is formed in a constant velocity joint and a cross joint. The drive shaft is screwed to the transmission or final differential, having a female threaded potion in the bolt hole.

Typically, a manufacture supplies to a customer with the drive shaft and the bolt, rather than have the bolt provided by the customer. When the bolt is transported to the customer with the constant velocity joint, the bolt is installed into the bolt hole, an adhesive is applied to a shaft portion of the bolt. The bolt transported to the customer under a condition in which the shaft portion of the bolt is glued to an inner surface of the bolt hole.

In the above case, the force for keeping the bolt in the bolt hole loses stability because an amount of the application of adhesive can be variable. The bolt may drop out from the bolt hole during the carrying.

SUMMARY OF THE INVENTION

It is an object of present invention to provide a support structure for a bolt of a drive shaft that keeps the bolt secure while being transported.

To achieve the above object, according to an aspect of the present invention, there is provided a support structure for bolting components of a drive shaft via a mounting member that comprises at least one mounting member of the drive shaft having formed through a bolt hole, a female thread portion which is formed in the mounting member, the bolt having a male thread portion that can be screwed into the female thread portion by inserting the bolt into the bolt hole, a heat-shrinkable tube is adapted to provide elastic contact at an inner surface of the bolt hole.

According to another aspect of the present invention, there is provided a method of temporarily fixing a bolt of a drive shaft to a mounted member by the bolt that comprises fixing a heat-shrinkable tube to a bolt by heating, temporarily fixing the bolt by forcing the heat-shrinkable tube into a bolt hole which is formed through at least a mount member of the drive shaft, and transporting the drive shaft with temporarily fixed bolt.

According to another aspect of the present invention, there is provided a drive shaft for a vehicle that comprises a constant velocity joint having a outer race which is formed with a first bolt hole for being fixed to a drive member of a drive train, a cross joint having a yoke which is formed with a second bolt hole for being fixed to a driven member of the drive train, a shaft which transmit a torque from the constant velocity joint to the cross joint, and a center bearing support having a bearing bracket which is formed with a third bolt hole for fixing the shaft to a vehicle body. A plurality of bolt each of which inserts into a respective one of the bolt holes for fixing to a corresponding portion, and an elastic member which is adapted to provide elastic contact to at least one portion of the bolt hole.

BRIEF DESCRIPTION OF THE DRAWINGS

FIG. 6 (b) shows a detailed view of the bolt shape, according to the second embodiment of the present invention.

FIG. 7 (b) shows an exploded cross sectional view of the bolt for fixing the heat-shrinkable tube, according to the second embodiment of the present invention.

FIG. 13 (b) shows a view of FIG. 13 (a) from the arrows B for the first embodiment of the present invention.

FIG. 14 (b) shows a view of FIG. 14 (a) from the arrows B for the second embodiment of the present invention.

FIG. 15 (b) shows a cross sectional view of the rubber tube member having a spring portion for the second embodiment of the present invention.

DETAILED DESCRIPTION OF THE INVENTION

Figure 1:
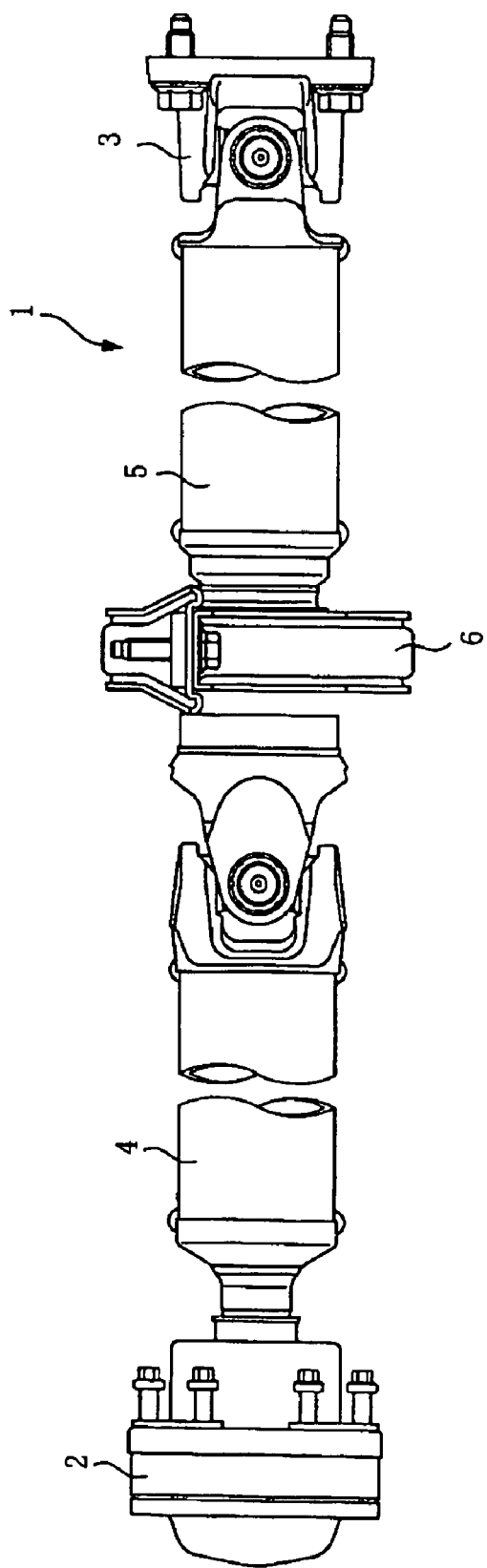
FIG. 1 shows an outline of a drive shaft for a vehicle comprising a constant velocity joint, a cross joint and a center bearing support, according to an embodiment of the present invention.
Figure 2:
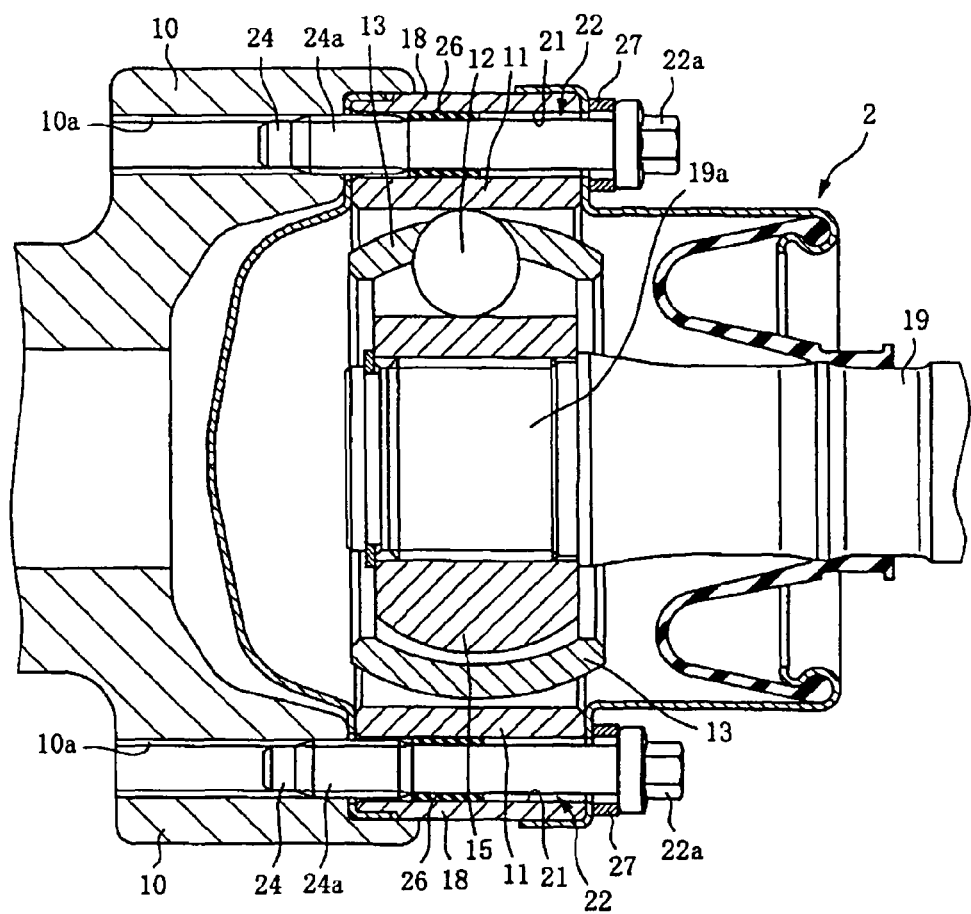
FIG. 2 shows a vertical sectional view of the constant velocity joint of FIG. 1, according to a first embodiment of the present invention.
Figure 3:
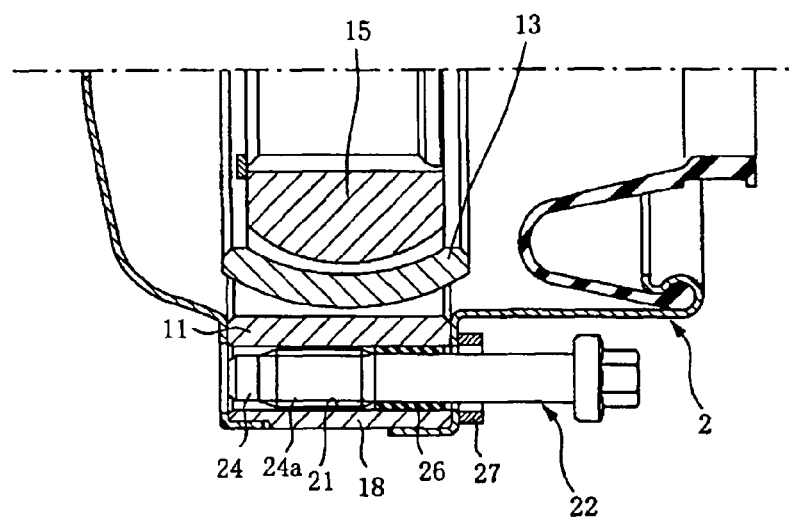
FIG. 3 shows the constant velocity joint of FIG. 2 before being fixed to a drive member, according to a first embodiment of the present invention.

Referring to the drawings, a description is made of embodiments of the present invention. FIG. 1 to FIG. 3 shows a first embodiment of the present invention.

FIG. 1 illustrates a drive shaft 1, which is transmits a torque from a drive member to a driven member. The drive shaft 1 several comprises components, including a constant velocity joint 2 on the drive side, a cross joint 3 on the driven side, a front shaft 4 as a tube connecting with the constant velocity joint 2, a rear shaft 5 as a tube connecting with the cross joint 3 and a center bearing support 6 connecting the front shaft 4 and the rear shaft 5.

As seen in FIG. 2, the constant velocity joint 2 comprises an outer race 11 formed as a cylinder fixed to a drive member 10, balls 12, a spherical cage 13 freely holding the outer side of the balls 12 on the plane dividing the front shaft 4 into two equal parts, an inner race 15 freely holding the inner side of the balls 12. An inside portion of the inner race 15 connects to a tip portion 19a of a stub shaft 19, which connects by a serration to the front shaft 4 that is formed as a cylinder.

The outer race 11 has a flange portion 18, having a bolt hole 21 formed through the flange portion along an axis of the outer race 11.

The constant velocity joint 2 is connected to the drive member 10 by a shaft portion 24 of a bolt 22 that is inserted into the bolt hole 21. A male thread portion 24a formed at a tip of the shaft portion 24 may be screwed into a female thread portion 10a formed in the drive member 10. Between the flange portion 18 and a bolt head 22a is a washer 27.

A heat-shrinkable tube 26 is fixed onto the shaft portion 24 of the bolt 22. The heat-shrinkable tube 26 is made from a thermoplastic elastomer that contracts when heated. The heat-shrinkable tube 26 is fixed to the shaft portion 24. The heat-shrinkable tube 26 contracts by heating the heat-shrinkable tube 26 before the shaft portion 24 is inserted into the bolt hole 21. Namely, the heat-shrinkable tube 26 is fitted onto the shaft portion 24.

The heat-shrinkable tube 26 with the shaft portion 24 affixed thereto is formed with an outer diameter that is slightly larger than an inner diameter of the bolt hole 21. When the shaft portion 24 is inserted into the bolt hole 21, an outer surface of the heat-shrinkable tube 26 is in elastic contact with the inner surface of the bolt hole 21, and the heat-shrinkable tube 26 is deformed.

Given a support structure such as the bolt 22, the heat-shrinkable tube may be fit onto the shaft portion 24 in advance, and when the shaft portion 24 is inserted into the bolt hole 21, the outer surface of the heat-shrinkable tube 26 is elastically deformed. With this arrangement, the bolt 22 can not drop from the bolt hole, and the bolt 22 may be supported temporarily in the bolt hole 21.

In this embodiment, a holding force of bolt 22 in the bolt hole 21 is constant, because the heat-shrinkable tube 26, itself has an elastic force. Therefore, the bolt 22 can be temporarily but firmly fixed to the bolt hole 21.

A temporarily fixed bolt can be moved toward the drive member 10 by pushing axially on the bolt. Thus, the constant velocity joint 2 can be easily fixed to the drive member 10 when desired.

Figure 4:
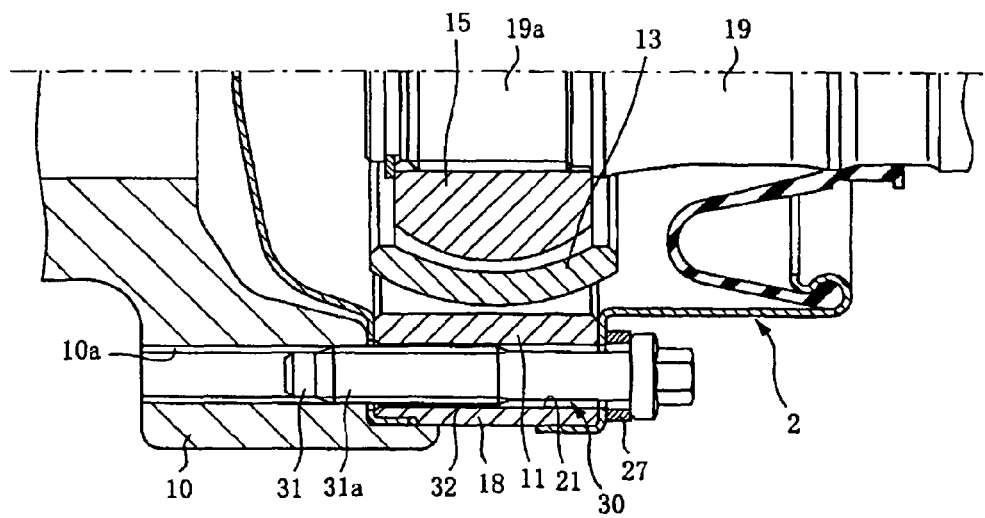
FIG. 4 shows a vertical sectional view of the constant velocity joint comprising a male threaded portion of a bolt provided with a heat-shrinkable tube, according to a second embodiment of the present invention.
Figure 5:
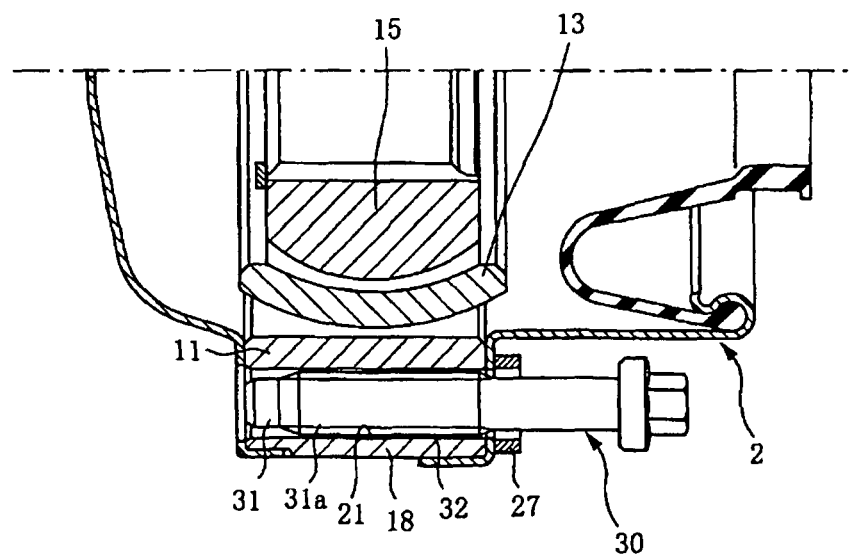
FIG. 5 shows the constant velocity joint of FIG. 4 before being fixed to the drive member, according to a second embodiment of the present invention.

FIG. 4 and FIG. 5 show a second embodiment of the present invention. A heat-shrinkable tube 32 is fixed onto a male thread portion 31a of a shaft portion 31 of a bolt 30.

Figure 6:
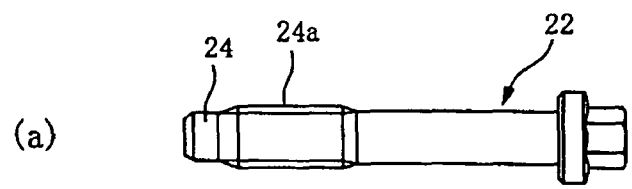
FIG. 6 (a) shows a detailed view of the bolt shape, according to the first embodiment of the present invention.
Figure 6:
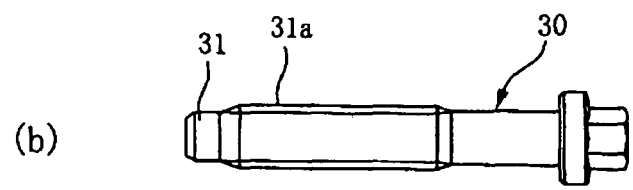

This structure represents a difference between the bolt 22 in the first embodiment and the bolt 30 in the second embodiment. FIG. 6 (a) and FIG. 7 (a) show a shape of the bolt 22 and the bolt 22 being fixed to the heat-shrinkable tube 26 of the first embodiment, respectively. FIG. 6 (b) and FIG. 7 (b) show a shape of the bolt 30 and the bolt 30 being fixed to the heat-shrinkable tube 32 of the second embodiment, respectively.

Figure 7:
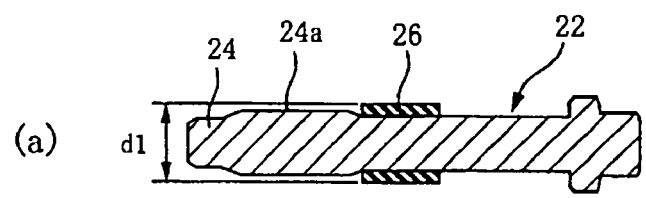
FIG. 7 (a) shows an exploded cross sectional view of the bolt for fixing the heat-shrinkable tube, according to the first embodiment of the present invention.
Figure 7:
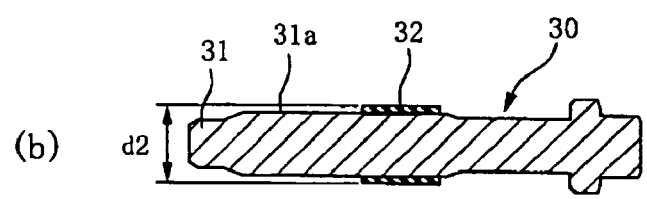

As illustrated in FIG. 6 (b), a male thread portion 31a that is formed on the shaft portion 31 of the bolt 30 is axially longer than a male thread portion 24a forming the shaft portion 24 of the bolt 22 in FIG. 6 (a). As illustrated in FIG. 7 (b), the heat-shrinkable tube 32 is fixed by inserting it onto the male thread portion 31a. A thickness of the heat-shrinkable tube 32 in FIG. 7 (b) is less than a thickness of the heat-shrinkable tube 26. A diameter d1 of the heat-shrinkable tube 26 is substantially the same as a diameter d2 of the heat-shrinkable tube 32.

When the heat-shrinkable tube 32 is inserted onto the male thread portion 31a of the bolt 30, the heat-shrinkable tube 32 is tightly adhered since the heat-shrinkable tube 32 deforms into the male thread portion 31a.

A result, a strong adhering force of the heat-shrinkable tube 32 can be obtained against the shaft portion 31 of the bolt 30. Specially, when the outer surface of the heat-shrinkable tube 32 is rubbed against an inner surface of the bolt hole 21, when the shaft portion 31 is inserted into the bolt hole 21, the mounting portion of the heat-shrinkable tube 32 will be hard to move against the shaft portion 32.

Figure 8:
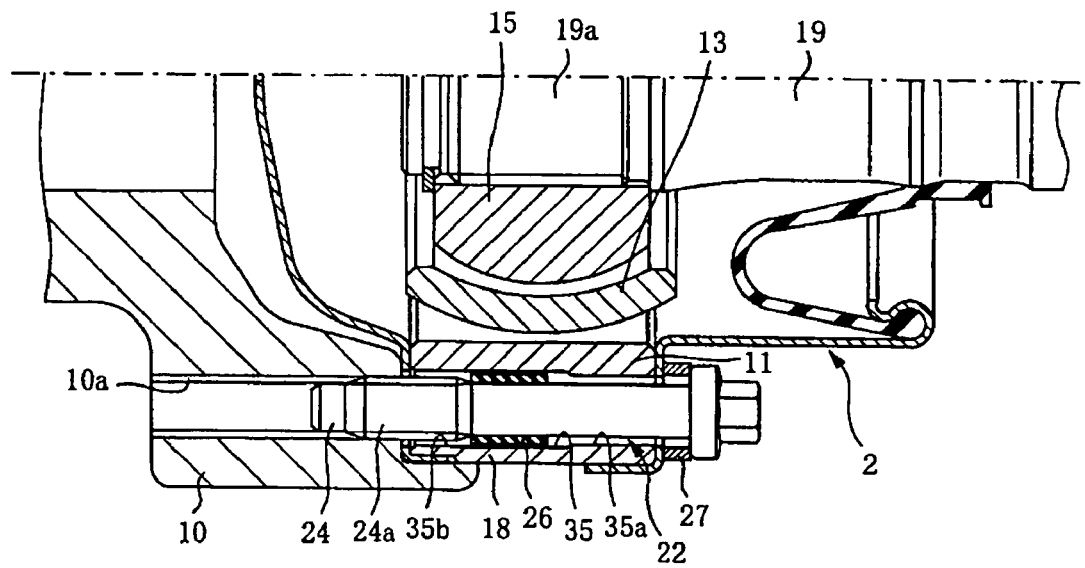
FIG. 8 shows a large diameter portion formed into a bolt hole, according to a third embodiment of the present invention.
Figure 9:
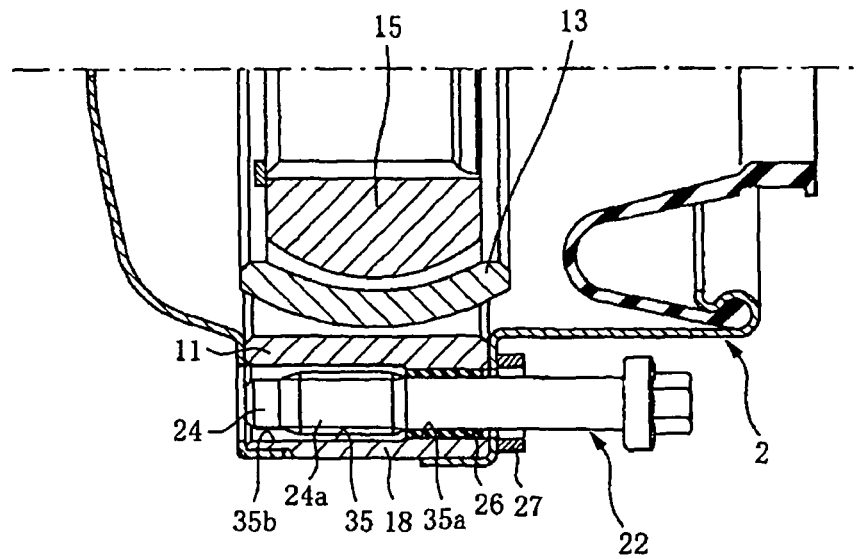
FIG. 9 shows the constant velocity joint of FIG. 8 before being fixed to a drive member, according to the third embodiment of the present invention.

FIG. 8 and FIG. 9 show a third embodiment of the present invention. The bolt 22 and the heat-shrinkable tube 26, as seen in FIG. 8, are the same as in FIG. 2 and FIG. 3. However, a bolt hole 35 for inserting a shaft portion 24 of the bolt 22 has a step portion 37 that is formed inside of the bolt hole 35. This is because the bolt hole 35 is formed at one part with a standard size portion 35a and at an adjacent part with a large diameter portion 35b. The translation between portions 35a and 35b form this form the step portion 37. The large diameter portion 35b has an inner diameter which is formed slightly lager than the outer diameter of the heat-shrinkable tube 26. An inner diameter of the standard size portion 35a is slightly smaller than the outer diameter of the heat-shrinkable tube 26.

By forming the standard size portion 35a and the large diameter portion 35b, the bolt 22 can be temporarily fixed to an inner surface of the standard size portion 35a of bolt hole 35 by elastically contacting a part of the heat-shrinkable tube 26.

In addition, when the constant velocity joint 2 is fixed to the drive member 10 by engagement of the female thread portion 10a of the drive member 10 and the male thread portion 24a of the bolt 22, the male thread 24a can be screwed into the female thread portion 10a by application of a normal screwing torque. This is because the inner surface of the large diameter portion 35a and the outer surface of the heat-shrinkable tube 26 have a separation distance that permits an influence of the heat-shrinkable tube 26 when screwed.

Figure 10:
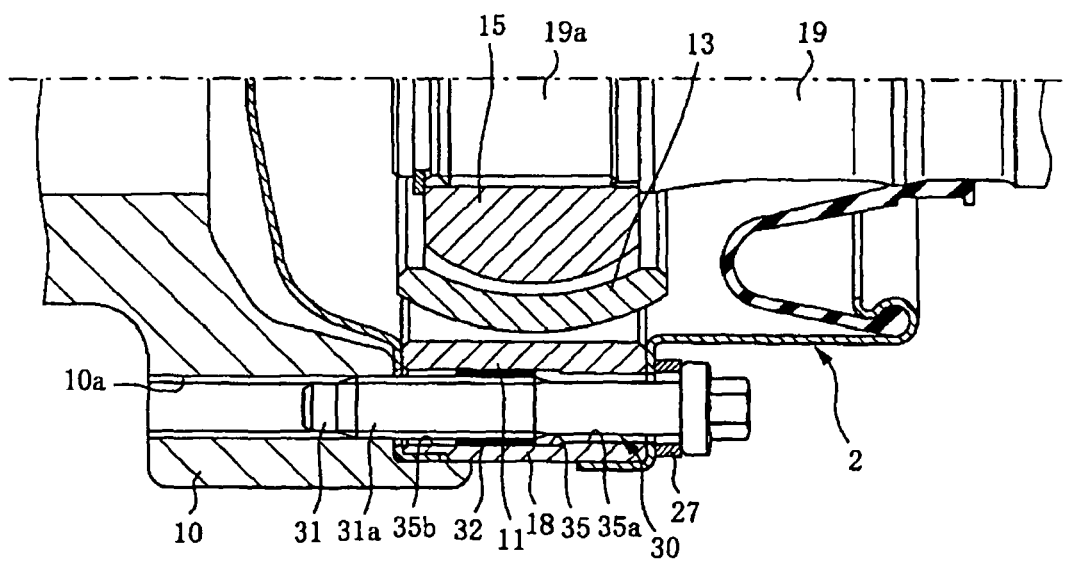
FIG. 10 shows a large diameter portion formed into a bolt hole, according to a fourth embodiment of the present invention.
Figure 11:
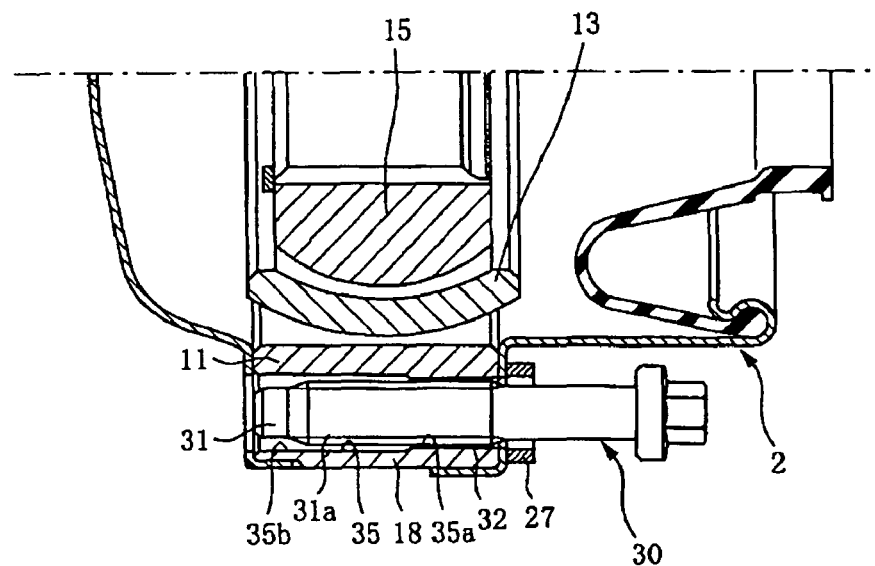
FIG. 11 shows the constant velocity joint of FIG. 10 before being fixed to a drive member, according to the third embodiment of the present invention.

FIG. 10 and FIG. 11 show a fourth embodiment of the present invention. This embodiment has the same advantage as the second embodiment of the present invention. A mounting portion of the heat-shrinkable tube 32 is hard to move against the male thread potion 31a if the outer surface of the heat-shrinkable tube 32 rubs with the inner surface of the standard size portion 35a since the heat-shrinkable tube 32 deforms into the male thread portion 31a.

To form the large diameter portion to the bolt hole 35, as in the third embodiment, when the male thread portion 31a is fixed to the female thread portion 10a, the screwing torque will not be increased if the separation between the outer surface of the heat-shrinkable tube 32 and the large diameter portion 35b is sufficient.

The heat-shrinkable tube 32 is thin. When the heat-shrinkable tube 32 is affixed by insertion onto the shaft portion 31, the heat-shrinkable tube 32 adheres to the shaft portion 31. Therefore, the outer race 11 will not be large because the bolt hole 35 does not need to be large. If the large diameter portion 35b is removed, it can support the temporary fixing of the bolt 22, 30.

Figure 12:
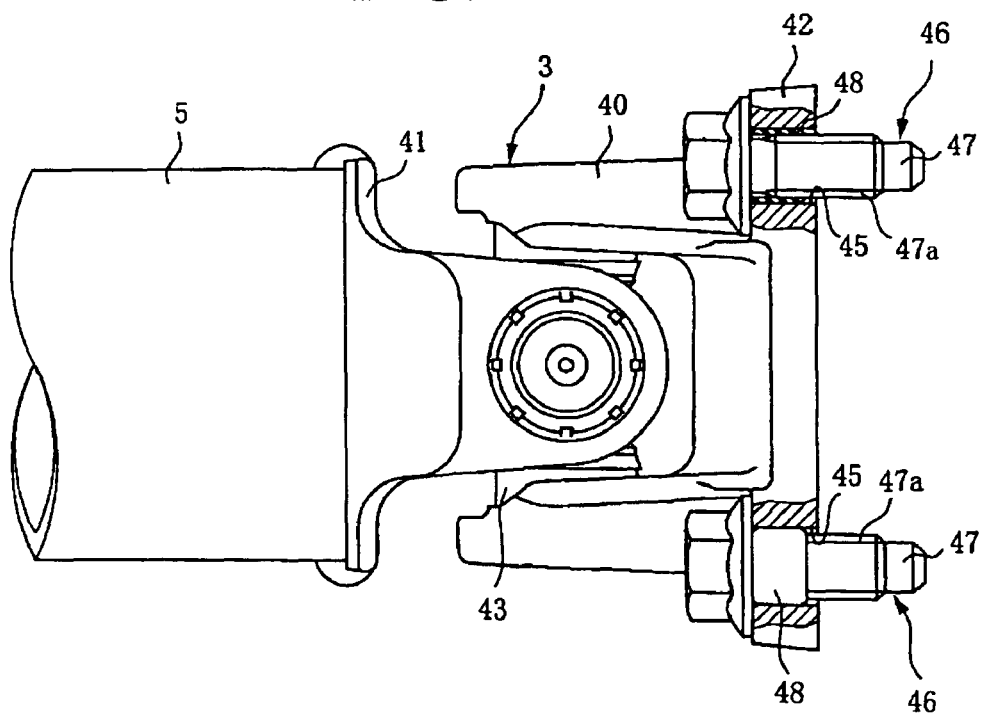
FIG. 12 shows a plain view of a cross joint for temporarily fixing the bolt of an embodiment of the present invention.

FIG. 12 illustrates a cross joint 3 that is fixed to a driven member as a final differential. (not shown). As shown in FIG. 12, the cross joint 3 comprises a driven side yoke 40 having a U-shape, a drive side yoke 41 connecting to the rear shaft 5 and a spider 43 that connects with the joint between the yokes 40, 41.

The driven side yoke 40 is formed integrally with a flange portion 42 that is flat at an outer portion thereof. A bolt hole 45 is formed at the flange portion 42 along an axis of the driven yoke 40. The cross joint 3 is fixed to the driven member by screwing a male thread potion 47a on a shaft portion 47 of a bolt 46 to a female thread portion (not shown) by inserting the shaft portion 47 of the bolt into the bolt hole 45.

As seen in the partially sectional view of the bolt hole 45, a cylindrical rubber tube 48 that is made of a solid rubber or other elastic member, is fixed onto the male thread portion 47a. After fixing to the male thread portion 47a, an outer diameter of the rubber tube 48 become larger than an inner diameter of the bolt hole 45. When the shaft portion 47 is inserted into the bolt hole 45, the shaft portion 47 is press fit into the bolt hole 45 and the rubber tube 48 deforms elastically.

A length of the bolt hole 45 is less than that of the bolt hole 21 of the first embodiment since the flange portion 42 is a flat, however, the rubber tube 48 can provide temporary support with the bolt hole 45. In particular, there is sufficient contact at an outer surface of the rubber tube 48 and the inner surface of the bolt hole 45 because of the rubber tube has a greater self-elasticity-force, as compared to the heat-shrinkable tube 26.

The cross joint 3 is temporarily affixed to the bolts 46 by effect of the rubber tube 48 on the shaft portion 47. The bolt 46 is temporarily fixed into the bolt hole 45 because an outer surface the rubber tube 48 and the inner surface of the bolt hole 45 contacts when the shaft portion 47 is inserted into the bolt hole 45.

Figure 13:
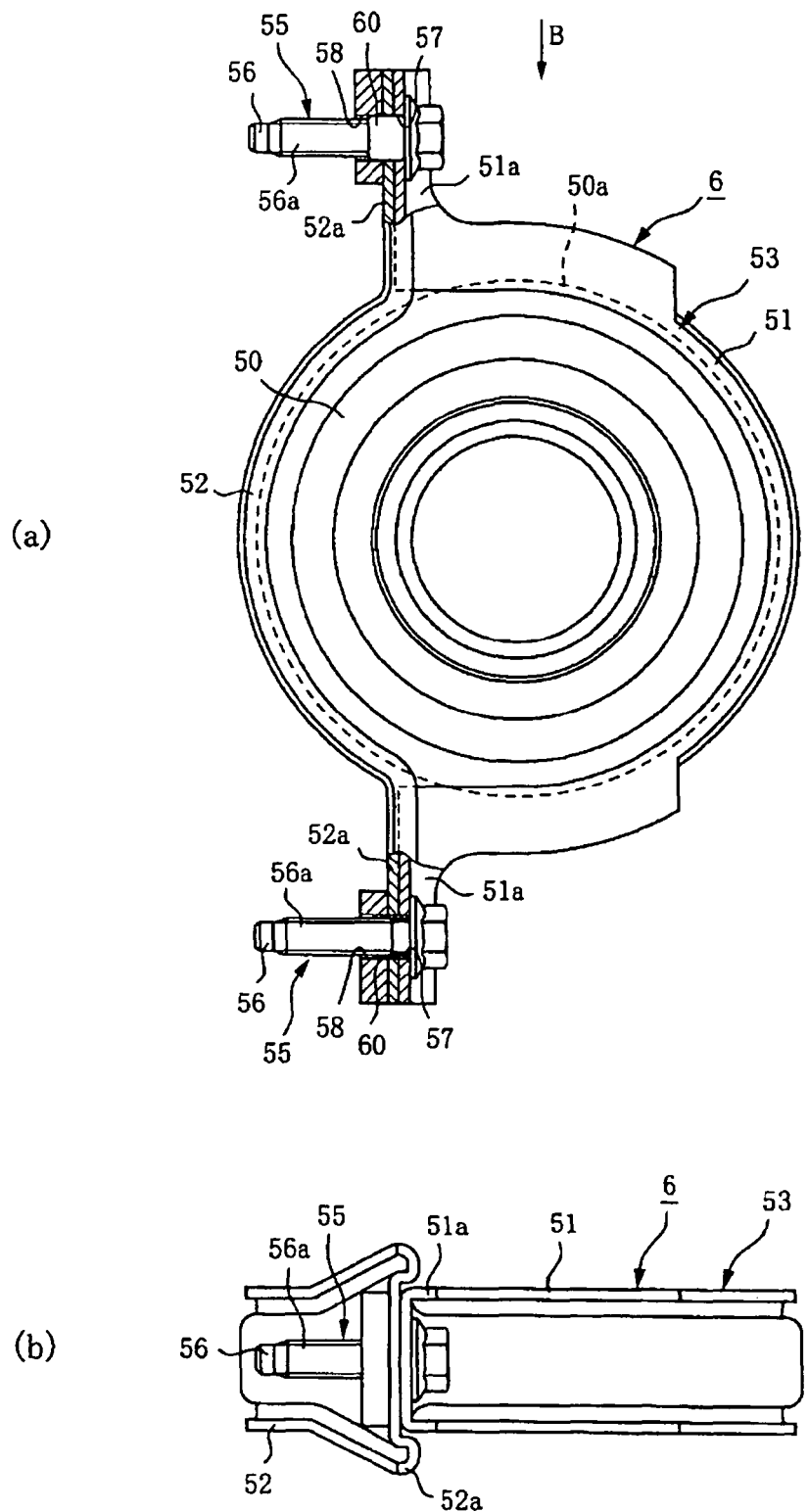
FIG. 13 (a) shows an elevation view of a center bearing support temporarily fixing the bolt of the first embodiment of the present invention.

FIG. 13 shows a center bearing support 6 that may be fixed to a vehicle body. As illustrated in FIG. 13, a center bearing support 6 comprises a ring shape bearing 50 for transmitting a torque between the front shaft 4 to the rear shaft 5, and a bearing bracket 53 that surrounds the bearing 50.

The bearing bracket 53 comprises a first bracket portion 51 having a U-shape, and a second bracket portion 52 also having a U-shape. Bolt holes 57, 58 are formed through two ends 51a of the first bracket portion 51 and the two ends 52a of the second bracket portion.

As illustrated in the FIG. 13 (b), the two ends 51a of the first bracket 51 have a width that is less than the width of two ends 52a of the second bracket 52, so that the ends 51a can be installed into the ends 52a. The widths of the first bracket portion 51 and the second bracket 52 are greater than a width of the bearing 50, as shown by dotted lines, such that each bracket 51, 52 is formed to receive an outer edge 50a of the bearing 50.

Figure 15:
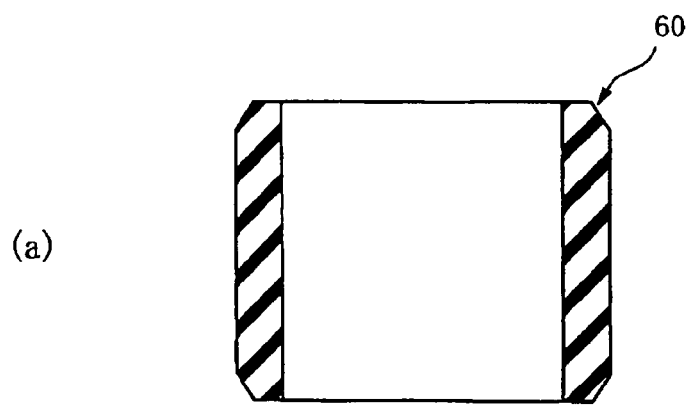
FIG. 15 (a) shows a cross sectional view of the rubber tube member of the first embodiment of the present invention.
Figure 15:
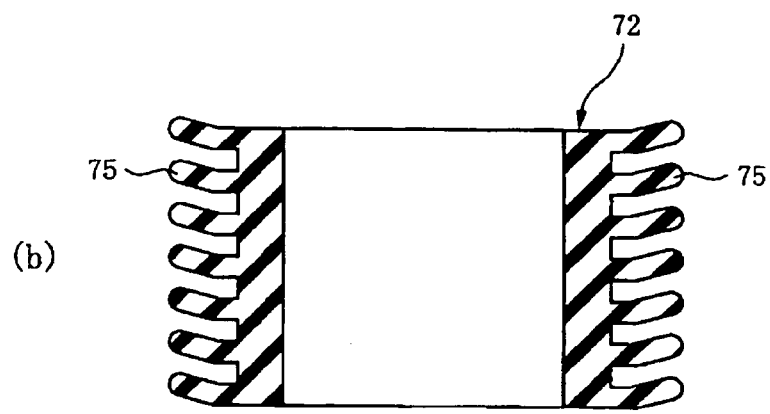

The center bearing 6 is fixed to the vehicle body by screwing the male thread portion 56a of the shaft portion 56 of the bolt 55 into a female thread portion formed on the vehicle body, such that the shaft portion 56 of the bolt 55 inserts into overlapping the bolt holes 57, 58. As seen in a partial sectional view of the bolt holes 57, 58, a rubber tube 60, that is made from solid rubber, is inserted into each of the bolt holes 57, 58. The rubber tube 60 is illustrated in FIG. 15 (a).

Accordingly, due to the center bearing support 6, As seen in a partially cross sectional view, the bolt 55 can temporarily support to the bolt holes 57, 58 because of an outer surface of the rubber tube 60 is contacted to an inner surface of the bolt holes 57, 58 by fixing the rubber tube 60 to the shaft portion 56 of the bolt 55.

The rubber tube 60 connects both of ends 51a and 52a. Thus, the first bracket potion 51 and the second bracket portion 52 can be supported for temporary fixing to the bearing 50, when the shaft portion 56 inserted into the bolt holes 57, 58 with integrating with each bracket potions 51, 52.

Figure 14:
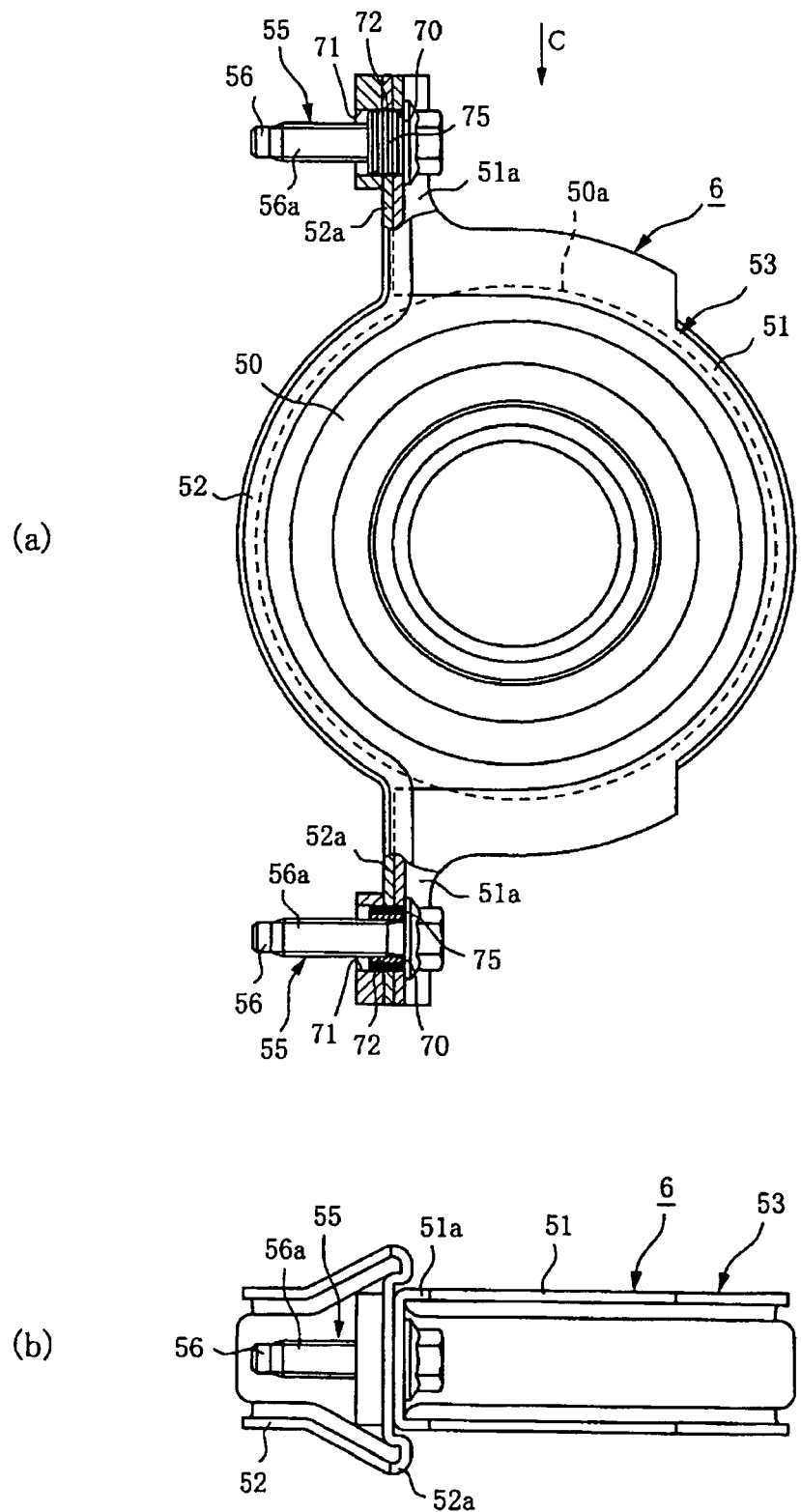
FIG. 14 (a) shows a rubber tube member having a spring portion, instead of a rubber tube member of FIG. 13, for the second embodiment of the present invention.

FIG. 14 shows another embodiment, especially as illustrated in FIG. 14 (a), where an inner diameter of bolt holes 70, 71, which are formed though to both of ends 51a of the first bracket portion 51 and both of ends 52a of the second bracket portion 52, are larger than the diameter of the bolt holes 57, 58 of FIG. 13 (a). A rubber tube 72, having a spring portion and being made from a solid rubber, is fixedly inserted onto the male thread portion 56a of the shaft portion 56 of the bolt 55.

As illustrated in FIG. 15 (b), a spring portion 75 is in the form of flanges that are formed on the circumference of the rubber tube 60 of the FIG. 15 (a). The spring portion 75 is formed along the axis of the cylindrical tube. Each flange of the spring portion 75 inclines from a center of the spring portion 75 toward a same direction.

When the rubber tube 72 having a spring portion is inserted into the shaft 56 of the bolt 55, if an inner diameter of the bolt holes 70, 71 is within a length of the spring portion 75, it can absorb a difference of the inner diameter of the bolt holes 70, 71 by a compressive of the spring portion 75 toward a direction of the incline. In this manner, the bolt holes 70, 71 can increase a degree of freedom of design.

The spring portion 75 has a structure for easy insertion into the bolt holes 70, 71, as its flanges are inclined along a direction of inserting of the shaft portion 55. The bolt 55 can not drop out from the bolt holes 70, 71 because the spring portion inclines in a direction opposite to that for pulling out of the bolt 55.

Figure 16:
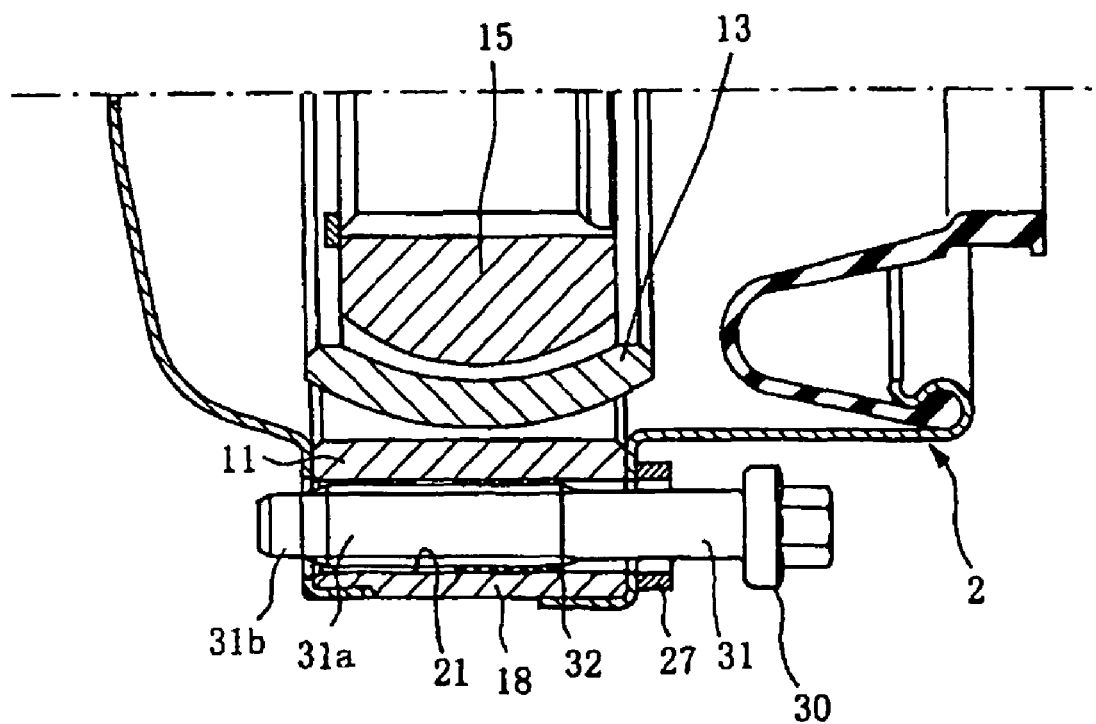
FIG. 16 shows a view where the location for temporarily fixing of FIG. 5 is changed according to an embodiment of the present invention.

FIG. 16 shows a structure for a bolt that is different from that of the bolt 30 of FIG. 5. the illustrated bolt uses an incomplete thread portion 31b as a projection at a tip of the shaft potion 31, such that it is projected from an end surface of the outer race 11 for providing temporary fixing.

When the constant velocity joint 2 is assembled to the drive member 10, the incomplete thread portion 31b can be used as a locate pin since the incomplete thread portion 31b is projected from the end surface. The bolt 22 in FIG. 3 also can have a function as a locate pin, based upon a projection of the shaft portion 24 from the end surface of the outer race 11.

Regarding to the foregoing embodiment, there are no need for an adhesive for temporally fixing a bolt to a main structure. Therefore, a step of applying on adhesive can be eliminated. It can obtain a simple assembling.

The entire contents of Japanese Patent Application P2004-272906 filed Sep. 21, 2004 are incorporated herein by reference.

What is claimed is:

1. A support structure for a drive shaft, comprising:
a mounting part of the drive shaft, the mounting part including a bolt hole;
a bolt including a shaft portion including a male thread portion, wherein the shaft portion is inserted in the bolt hole, and the male thread portion is adapted to be screwed on a female thread portion of a mounting member;

a heat-shrunk tube heat-shrunk fitted on an outer radial periphery of the shaft portion of the bolt, and disposed between the outer radial periphery of the shaft portion of the bolt and an inner radial periphery of the bolt hole so as to be elastically compressed therebetween, to fix the bolt to the bolt hole by static friction; and wherein the heat-shrunk tube is made from a thermoplastic elastomer;

wherein the mounting part is a constant velocity joint which has an outer race, wherein the outer race of the constant velocity joint has the bolt hole.

2. The support structure as claimed in claim 1,
wherein the mounting part is a constant velocity joint which has an outer race,
wherein the outer race of the constant velocity joint has the bolt hole.

3. The support structure as claimed in claim 1,
wherein the shaft portion of the bolt has the male thread portion at a tip side and has a base portion at the bolt hole side,
wherein the heat-shrunk tube is fixed to the base portion of the bolt.

4. The support structure as claimed in claim 1,
wherein the heat-shrunk tube is fixed to the male thread portion of the bolt.

5. The support structure as claimed in claim 1,
wherein the heat-shrunk tube is formed with a circumference that is larger than the circumference of at least one portion of an inner diameter of the bolt hole so that a periphery of the heat-shrinkable tube is in contact with an entire inner surface of the bolt hole.

6. The support structure as claimed in claim 1,
wherein the bolt hole has a large diameter portion, which is formed on an inner surface of the bolt hole and is located closer to the mounted member than a portion of the bolt hole that is in contact with the heat-shrunk tube.

7. The support structure as claimed in claim 6,
wherein an outer surface of the heat-shrunk tube can be separated to an inner surface of the large diameter portion when the heat-shrunk tube moves to the large diameter portion.

8. The support structure as claimed in claim 1,
wherein the bolt has a projecting portion at a tip with a diameter that is smaller than the diameter of the male thread portion.

9. The support structure as claimed in claim 1, wherein the bolt has a projecting portion at a tip, wherein the projecting portion projects from an end surface of the outer race.

10. The support structure as claimed in claim 9, wherein the projecting portion of the bolt includes an incomplete thread portion.

11. A support structure for a drive shaft, comprising:
a mounting part of the drive shaft, the mounting part including a bolt hole;
a bolt including a shaft portion including a male thread portion, wherein the shaft portion is inserted in the bolt hole, and the male thread portion is adapted to be screwed on a female thread portion of a mounting member;
a heat-shrunken tube provided fitted on an outer radial periphery of the shaft portion of the bolt, and disposed between the outer radial periphery of the shaft portion of the bolt and an inner radial periphery of the bolt hole so as to be elastically compressed therebetween, to fix the bolt to the bolt hole by static friction; and
wherein the heat-shrunk tube is made from a thermoplastic elastomer;
wherein the mounting part is a constant velocity joint which has an outer race, wherein the outer race of the constant velocity joint has the bolt hole.

12. A support structure for a drive shaft, comprising:
a mounting part of the drive shaft, the mounting part including a bolt hole;
a bolt including a shaft portion including a male thread portion, wherein the shaft portion is inserted in the bolt hole, and the male thread portion is adapted to be screwed on a female thread portion of a mounting member;
a thermoplastic elastomer tube provided in a heat-shrunken state on an outer radial periphery of the shaft portion of the bolt, and disposed between the outer radial periphery of the shaft portion of the bolt and an inner radial periphery of the bolt hole so as to be elastically compressed therebetween, to fix the bolt to the bolt hole by static friction; and
wherein the mounting part is a constant velocity joint which has an outer race, wherein the outer race of the constant velocity joint has the bolt hole.

\* \* \* \* \*